(12) United States Patent
Ammon

(10) Patent No.: US 6,615,635 B2
(45) Date of Patent: Sep. 9, 2003

(54) METHOD OF MAKING A LEVER-TYPE CAM FOLLOWER, AND LEVER-TYPE CAM FOLLOWER

(75) Inventor: Reinhard Ammon, Nuremberg (DE)

(73) Assignee: INA Walzlager Schaeffler oHG (DE)

( * ) Notice: Subject to any disclaimer, the term of this patent is extended or adjusted under 35 U.S.C. 154(b) by 0 days.

(21) Appl. No.: 09/883,787

(22) Filed: Jun. 18, 2001

(65) Prior Publication Data

US 2002/0029603 A1 Mar. 14, 2002

Related U.S. Application Data

(60) Provisional application No. 60/230,957, filed on Sep. 7, 2000.

(30) Foreign Application Priority Data

Jun. 20, 2000 (DE) .......................................... 100 30 341

(51) Int. Cl.$^7$ ................................................. B21D 31/00
(52) U.S. Cl. ...................... 72/379.2; 74/569; 123/90.39; 29/888.2
(58) Field of Search ............................... 72/379.2, 352, 72/353.2; 74/569; 123/90.1, 90.39; 29/888.2

(56) References Cited

U.S. PATENT DOCUMENTS

| | | | | | |
|---|---|---|---|---|---|
| 3,858,427 | A | * | 1/1975 | Euteneuer et al. | ............. 72/334 |
| 4,571,982 | A | * | 2/1986 | Bishop et al. | ................. 72/400 |
| 5,016,582 | A | * | 5/1991 | Mills | ........................ 123/90.39 |
| 5,251,585 | A | * | 10/1993 | Graber | ..................... 123/90.39 |
| 5,357,917 | A | * | 10/1994 | Everts | ...................... 123/90.39 |
| 5,678,305 | A | * | 10/1997 | Nagano et al. | ........... 123/90.39 |
| 5,720,245 | A | * | 2/1998 | Calka | ....................... 123/90.41 |
| 6,062,184 | A | * | 5/2000 | Engelhardt et al. | ....... 123/90.39 |
| 6,199,527 | B1 | * | 3/2001 | Okubo et al. | ............. 123/90.39 |
| 6,425,361 | B1 | * | 7/2002 | Motohashi | ................ 123/90.41 |

* cited by examiner

Primary Examiner—Allen Ostrager
Assistant Examiner—John S Goetz
(74) Attorney, Agent, or Firm—Muserlian, Lucas and Mercanti

(57) ABSTRACT

A method for making a support (6) for a valve stem in a lever-type cam follower made of sheet metal is proposed. According to the invention, this support (6) with its guide walls (7, 8) is made by cold forging.

4 Claims, 1 Drawing Sheet

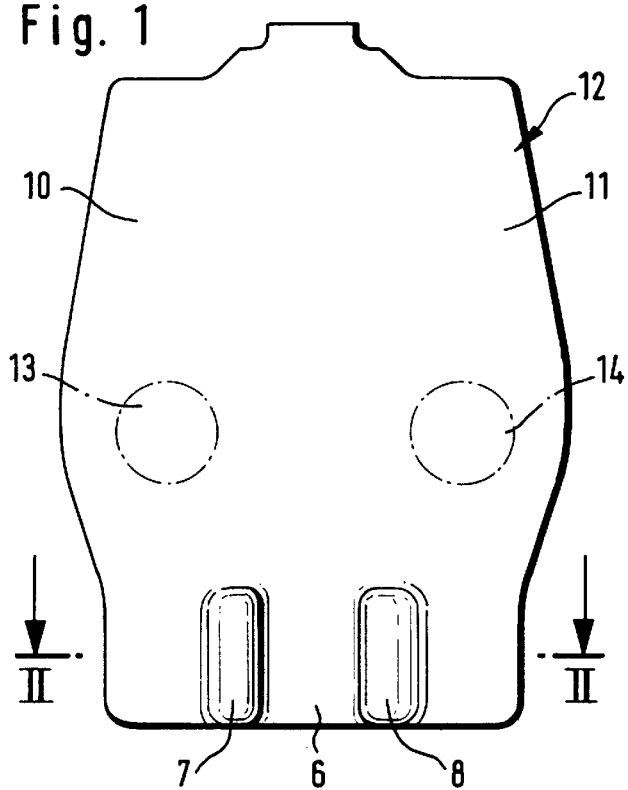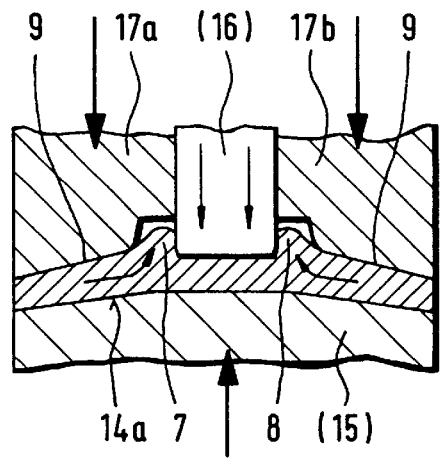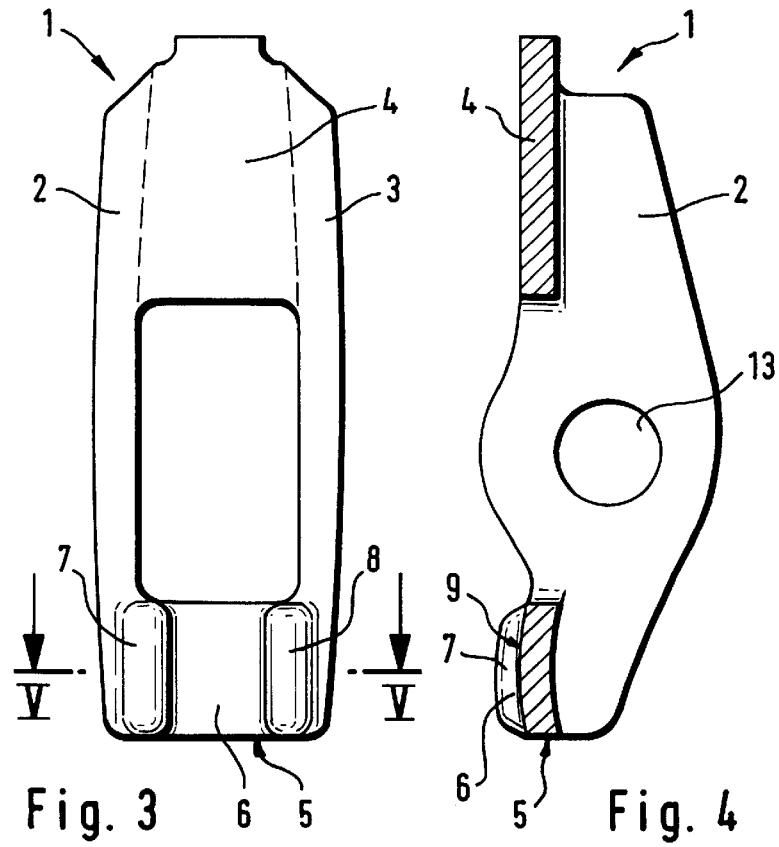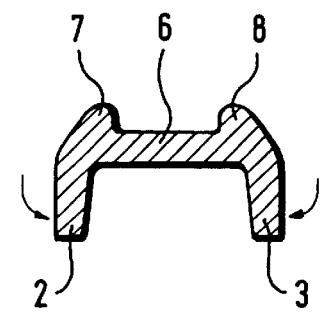

METHOD OF MAKING A LEVER-TYPE CAM FOLLOWER, AND LEVER-TYPE CAM FOLLOWER

The application claims the benefit of provisional application 60/230,957, filed Sep. 7, 2000.

DESCRIPTION

1. Field of the Invention

The invention concerns a method of making a lever-type cam follower out of thin-walled sheet metal, particularly for a valve train of an internal combustion engine, said cam follower comprising two parallel side walls connected by a crossbeam, an underside of the crossbeam having a support for at least one gas exchange valve on one end, said support being limited by guide walls extending parallel to the side walls, and the invention also concerns a lever-type cam follower having the aforesaid features.

2. Background of the Invention

A cam follower of the pre-cited type is known from U.S. Pat. No. 5,016,582 considered to be generic art. In this cam follower, the support for a valve stem is realized by a complex double bending procedure. Due to the higher mass lying relatively far from the fulcrum, an unnecessarily high mass moment of inertia can be expected. Further, drawbacks with regard to design space are evident to a person skilled in the art. These drawbacks arise from the fact that a doubled wall is situated on each side of the support. It is also possible for cracks to be formed in the bent region.

Another lever-type cam follower of the pre-cited type made of sheet metal is disclosed in DE-OS 198 30 427. Although the above-mentioned multiple bend design is not used in this cam follower, the support for the valve stem is realized through bent-over tabs that have first to be punched out from an end of the cam follower. The ends of the tabs are fixed by welding on the underside of the cam follower. It must be observed that the punching, bending and welding of the tabs involves a relatively great amount of fabrication work. Besides this, cracks can occur in the bent region. The use of welding results in an undesired input of heat into the material which can lead to microstructural changes therein. Furthermore, the weld joint constitutes a quality risk. It must also be noted that the bent region of the tabs unnecessarily lengthens the cam follower in axial direction. This can cause problems with the design space during installation, or again, the mass moment of inertia of the cam follower is unnecessarily increased.

OBJECT OF THE INVENTION

The object of the invention is therefore to propose a method of making a lever-type cam follower, and a lever-type cam follower in which the initially stated drawbacks are eliminated by simple measures.

SUMMARY OF THE INVENTION

According to the invention, this object is achieved by the features recited in the characterizing part of claim 1, and by the feature of the characterizing part of independent claim 5.

The method proposed by the invention comprises the following work steps, to which further intermediate steps may be added:

a) punching out a blank from cold or hot rolled strip;

b) making the support and the guide walls by cold forging by applying a stamping die to the underside laterally of the guide walls to be formed, said stamping die acting in such a way on the underside and having such a shape that a region of the blank situated under the stamping die is thinned out and the guide walls are formed by a backward plastic flow of the thinned-out material, and c) forming the side walls with the crossbeam enclosed by bending long sides of the blank at a right angle to the original blank.

Alternatively, it is basically within the scope of the invention to make the guide walls by cold forging.

By the proposed cold forging is meant, in particular, an extrusion molding and stamping procedure. This has the advantage that relatively clean surfaces with a relatively higher end precision can be obtained. Moreover, a desired increase of hardness is obtained in the region of deformation.

The material of the guide walls, that are thus made for the first time in the art in a sheet metal cam follower by cold forging, is obtained by plastic flow out of material situated on the side of the guide walls, as seen in a top view of the underside. The material of the blank situated under the stamping die is thinned out. By the use of adequate counterdies, roughly indicated in the drawing, is not only a geometrically very accurate support defined but also the upper side in the region of the support.

A particular advantage of the method of the invention is that an excellent stiffening of the cam follower in the region of the support is to be noted. The cam follower requires less design space in longitudinal direction than prior art cam followers. Further, a reduction of width in the region of the support is also possible because double bending can be dispensed with. The cam follower has only a relatively low weight and, due to the absence of material accumulation at a distance from the fulcrum, a favorable mass moment of inertia is obtained. In addition, it is clear to a person skilled in the art that the crack formation mentioned in the introductory part of the description no longer occurs. The cost of manufacturing can be distinctly reduced compared to the initially commented cam followers.

The lever-type cam follower is particularly envisaged as a rocker arm, a finger lever or an oscillating arm. An adequate cam-contacting surface in cam followers that are not activated by tappet push rods can be made optionally as a rolling-bearing mounted roller or as a sliding surface.

According to another feature of the invention, the support has a convex shape, as viewed in the longitudinal direction of the cam follower, so that, for example, the excursion area on the cam follower for the contacting end of the valve stem is reduced. On the other hand, this also creates a particularly stiff support. It is likewise conceivable and within the scope of the invention to implement other shapes of valve stem supports depending on the particular use.

It is particularly advantageous if the method steps proposed in claim 1, to which further intermediate steps may be added, are all carried out on one and the same machine. This results in low manufacturing costs and in a concomitant reduction of unit time. Furthermore, the weight of material used is reduced compared to the prior art commented in the introductory part of the description because the connections for the bent tabs (only when made of strip material) are dispensed with.

According to a further proposition of the invention, the guide walls are configured so as to have a height of at least 2.5 mm relative to the support situated therebetween. However, it is also conceivable to provide different heights, for example, also smaller heights, depending on the particular use. Thus, an excellent guidance of the cam follower can be obtained on every type of valve shaft end. After it has been mounted, the cam follower can no longer slip off the end of the valve stem before the initial ignition of the engine, and a smooth gas exchange is achieved when the engine is in operation.

Alternatively to the method claim 1, independent claim 5 proposes a cam follower whose guide walls are formed by cold forging.

BRIEF DESCRIPTION OF THE DRAWINGS

The invention is described more closely below with reference to the drawings.

FIG. 1 is a top view of an underside of the cut-out sheet metal (blank) with stamped guide walls, said underside being situated opposite the gas exchange valve when installed;

FIG. 2 is a section along line II—II of FIG. 1, with roughly indicated dies;

FIG. 3 is a view of the underside of the cam follower with bent side walls;

FIG. 4 is a side view of the cam follower of FIG. 3, and

FIG. 5 is a section along line V—V of FIG. 3.

DETAILED DESCRIPTION OF THE DRAWINGS

The lever-type cam follower 1 made by the method of the invention is made of thin-walled sheet metal. As best seen in FIGS. 3 to 5, the cam follower has two parallel side walls 2, 3 which are connected to each other by a crossbeam 4. Thus as seen in cross-section, the cam follower 1 has a U-shaped geometry. On one of its ends 5, the cam follower 1 has a support 6 for an end of a valve stem. The support 6 is limited on both sides by guide walls 7, 8 which extend at equal distances from a central longitudinal axis of the cam follower 1 and are disposed on an underside 9 of the cam follower 1. As best seen in FIG. 4, at this location, the guide walls 7, 8 and the support 6 have a crowned or convex shape. As mentioned at the beginning of the description, other shapes are also conceivable which the engineer will choose depending on the particular case of use.

FIG. 1 discloses the blank of the cam follower 1 after the inventive stamping step of its guide walls 7, 8. In the long sides 10, 11 of the blank 12 which have still to be bent, guide bores 13, 14 for the axle of a roller on which the cam will run are roughly indicated. These guide bores 13, 14 can be punched or pre-stamped already before the bending of the side walls 2, 3, but it is also possible to make these guide bores after said bending.

As to FIG. 2:

After the blank 12 (without guide walls 7, 8) shown in FIG. 1 has been punched out, the guide walls 7, 8 are made by cold forging (stamping and extrusion molding). For this, the blank 12 is laid with its upper side 14a on a counterdie 15 roughly indicated in FIG. 2. A holding die 16 is applied to the region in which the support 6 is to be made. A stamping die 17a, 17b is sketched in this figure on each side of the holding die 16. When an adequate force is applied through the stamping die 17a 17b, the contacted region of the blank is shaped and a backward plastic flow (see arrows) takes place in the blank which results in the formation of the guide walls 7, 8. This backward flow effects a thinning-out of the region on the sides of the guide walls 7, 8 which is loaded by the stamping die 17a, 17b. It is conceivable and also within the scope of the invention to form the guide walls 7, 8 at least partially from the material displaced by the die designated here as a holding die 16.

After the stamping step, the long sides 10, 11 of the blank 12 are bent, preferably in the same machine, to form the side walls 2, 3.

REFERENCE NUMERALS

1 Cam follower
2 Side wall
3 Side wall
4 Crossbeam
5 End
6 Support
7 Guide wall
8 Guide wall
9 Underside
10 Long side
11 Long side
12 Blank
13 Guide bore
14 Guide bore
14a Upper side
15 Counterdie
16 Holding die
17a Stamping die
17b Stamping die

What is claimed is:

1. A method of making a lever-type cam follower (1) out of thin-walled sheet metal, particularly for a valve train of an internal combustion engine, said cam follower (1) comprising two parallel side walls (2,3) connected by a crossbeam (4), an underside (9) of the crossbeam (4) having a support (6) for at least one gas exchange valve on one end (5), said support (6) being limited by guide walls (7,8) extending parallel to the side walls (2,3) characterized by the following steps to which further intermediate steps can be added:

a) punching out a blank (12) from cold or hot rolled strip;

b) making the support (6) and the guide walls (7,8) by a stamping and extrusion molding process by:

$b_1$) simultaneously applying, laterally of the guide walls (7,8) to be formed, two stamping dies (17a, 17b) to the underside (9) and a continuous, smooth-faced counterdie (15) to the upper side;

$b_2$) the two stamping dies (17a, 17b) exclusively acting in such a way on the underside (9) of the blank (12) and having such a shape that a region of the blank (12) situated under these stamping dies is thinned out and a holding die (16) on whose side walls the flow of material of the guide walls (7,8) are formed by a backward plastic flow of the thinned-out material and which holding die at the same time services to guarantee the thickness of the crossbeam, and c) forming the side walls (2,3) with the crossbeam (4) which in the region or the support (6)., the crossbeam (4) has approximately the same thickness as the side walls enclosed by bending long sides (10,11) of the blank (12) at a right angle to the original blank (12), that the side walls (2,3) enclose together with the crossbeam (4), a smooth-faced U-profile.

2. A method according to claim 1, characterized in that as seen in longitudinal direction of the cam follower (1), the support (6) has a convex shape.

3. A method according to claim 1, characterized in that the method is carried out on a single machine having a multi step punching and stamping press.

4. A method according to claim 1, characterized in that the guide walls (7, 8) have a height of approximately 2.5 mm or more relative to the support (6) situated therebetween.

* * * * *